(12) United States Patent
Kim et al.

(10) Patent No.: US 9,240,280 B2
(45) Date of Patent: Jan. 19, 2016

(54) MULTILAYER CERAMIC CAPACITOR AND METHOD OF MANUFACTURING THE SAME

(71) Applicant: SAMSUNG ELECTRO-MECHANICS CO., LTD., Suwon, Gyunggi-do (KR)

(72) Inventors: Byong Gyun Kim, Gyunggi-do (KR); Duk Hyun Chun, Gyunggi-do (KR); Kyoung No Lee, Gyunggi-do (KR); Youn Sik Jin, Gyunggi-do (KR); Eun Sang Na, Gyunggi-do (KR); Doo Young Kim, Gyunggi-do (KR)

(73) Assignee: SAMSUNG ELECTRO-MECHANICS CO., LTD., Suwon-Gyunggi-Do (KR)

( * ) Notice: Subject to any disclaimer, the term of this patent is extended or adjusted under 35 U.S.C. 154(b) by 201 days.

(21) Appl. No.: 14/142,668

(22) Filed: Dec. 27, 2013

(65) Prior Publication Data

US 2015/0085422 A1 Mar. 26, 2015

(30) Foreign Application Priority Data

Sep. 24, 2013 (KR) .......................... 10-2013-0113226

(51) Int. Cl.
*H01G 4/232* (2006.01)
*H01G 4/30* (2006.01)
*H01G 4/005* (2006.01)

(52) U.S. Cl.
CPC ............ *H01G 4/2325* (2013.01); *H01G 4/232* (2013.01); *H01G 4/30* (2013.01); *H01G 4/005* (2013.01)

(58) Field of Classification Search
CPC ......... H01G 4/30; H01G 4/005; H01G 4/008; H01G 4/10; H01G 4/228; H01G 4/232; H01G 4/2325

USPC ....................... 361/301.4, 303, 305
See application file for complete search history.

(56) References Cited

U.S. PATENT DOCUMENTS

| | | | | |
|---|---|---|---|---|
| 5,107,394 A | * | 4/1992 | Naito | H01C 17/281 29/25.42 |
| 2001/0043454 A1 | * | 11/2001 | Yoshii | H01G 4/232 361/321.2 |
| 2008/0112109 A1 | * | 5/2008 | Muto | C04B 35/4682 361/301.4 |
| 2010/0067170 A1 | | 3/2010 | Koga | |
| 2014/0029157 A1 | * | 1/2014 | Kwag | H01G 4/30 361/301.4 |

FOREIGN PATENT DOCUMENTS

KR 10-2010-0032341 A1 3/2010

* cited by examiner

*Primary Examiner* — Dion R Ferguson
(74) *Attorney, Agent, or Firm* — McDermott Will & Emery LLP

(57) ABSTRACT

A multilayer ceramic capacitor includes a ceramic body including dielectric layers; first and second internal electrodes facing each other while having the dielectric layer disposed therebetween, and alternately exposed to end surfaces of the ceramic body; first and second external electrodes electrically connected to the first and second internal electrodes, wherein each of the first and second external electrodes includes a first external electrode layer formed of material containing copper and glass and extending from an end surface of the ceramic body to portions of main and side surfaces of the ceramic body; a second external electrode layer formed of material containing glass, disposed on the first external electrode layer, and being shorter than the first external electrode layer to expose portion of the first external electrode layer; and a third external electrode layer formed of material containing copper and glass and covering the first and second external electrode layers.

8 Claims, 4 Drawing Sheets

MULTILAYER CERAMIC CAPACITOR AND METHOD OF MANUFACTURING THE SAME

CROSS-REFERENCE TO RELATED APPLICATION

This application claims the benefit of Korean Patent Application No. 10-2013-0113226 filed on Sep. 24, 2013, with the Korean Intellectual Property Office, the disclosure of which is incorporated herein by reference.

BACKGROUND

The present disclosure relates to a multilayer ceramic capacitor and a method of manufacturing the same.

Examples of electronic components using ceramic materials include a capacitor, an inductor, a piezoelectric element, a varistor, and a thermistor.

A multilayer ceramic capacitor, a multilayer chip electronic component, is a chip-type condenser that is mounted on a printed circuit board of various electronic products such as display devices including liquid crystal displays (LCDs) and plasma display panels (PDPs), computers, personal digital assistants (PDAs), cell phones, and the like, to allow electricity to be charged therein and discharged therefrom.

A multilayer ceramic capacitor (MLCC) is used in various types of electronic components since it is relatively small and can be easily mounted while implementing high capacitance. The multilayer ceramic capacitor may include a ceramic body in which a plurality of dielectric layers and internal electrodes are alternately laminated, and external electrodes. The external electrodes may be formed by applying a conductive paste on a surface of the ceramic body.

Recent advances in technologies of electronic products have led to an increasing demand for small, high-capacitance multilayer ceramic capacitors.

In order to implement high capacitance, the number of stacked internal electrodes needs to be increased, resulting in an increase in the size of the ceramic body.

In this case, an allowable range of external electrode thickness with respect to the entirety of a size of a multilayer ceramic capacitor including external electrodes installed in each product may be significantly reduced, and thus, it is necessary to reduce the thickness of the external electrodes.

However, external electrodes formed of copper-glass materials typically used in an existing ultra-thin, ultra-high capacitance multilayer ceramic capacitor may suffer from reliability problems due to the permeation of a plating solution when they are provided as thin films.

In order to address the reliability issue due to a reduction of density in the external electrodes when the thin films are applied, an attempt to increase the content of glass in the external electrodes has been made. However, an increase in the content of glass may cause low electrical conductivity with internal electrodes, non-plated portions due to poor plating, and soldering failures when the capacitor is mounted on a substrate.

Patent Document 1 discloses a multilayer ceramic capacitor including external electrodes having a double-layer structure, but fails to disclose a triple-layer structure in which two external electrode layers containing copper and glass are disposed in a region in contact with internal electrodes and a region to be plated, and one external electrode layer containing glass is disposed therebetween.

RELATED ART DOCUMENT (Patent Document 1) Korean Patent Laid-open Publication No. 2010-0032341

SUMMARY

An aspect of the present disclosure may provide a multilayer ceramic capacitor and a method of manufacturing the same that can address reliability issues due to a reduction in external electrode density while securing satisfactory electrical conductivity with internal electrodes and superior plating properties.

According to an aspect of the present disclosure, a multilayer ceramic capacitor may include: a ceramic body including a plurality of dielectric layers; first and second internal electrodes facing each other while having at least one dielectric layer disposed therebetween, and alternately exposed to end surfaces of the ceramic body; first and second external electrodes electrically connected to the first and second internal electrodes, respectively, wherein each of the first and second external electrodes may include a first external electrode layer formed of a material containing copper and glass and extending from an end surface of the ceramic body to portions of main and side surfaces of the ceramic body; a second external electrode layer formed of a material containing glass, disposed on the first external electrode layer, and being shorter than the first external electrode layer to expose a portion of the first external electrode layer; and a third external electrode layer formed of a material containing copper and glass and covering the first and second external electrode layers.

A width of a band of the second external electrode layer may be equal to or greater than 3 μm from the end surface of the ceramic body and may be less than a width of a band of the first external electrode layer by 10 μm or more.

The second external electrode layer may contain copper, and a content of glass in the second external electrode layer may be 60% or higher.

The multilayer ceramic capacitor may further include a plating layer disposed on the third external electrode layer.

According to another aspect of the present disclosure, a method of manufacturing a multilayer ceramic capacitor may include: preparing a laminate by stacking a plurality of ceramic sheets having first and second internal electrodes formed thereon while the first and second internal electrodes face each other, having at least one ceramic sheet interposed therebetween, and pressing the stacked sheets; cutting the laminate into chips each corresponding to a capacitor and sintering the same to obtain a ceramic body; and forming first and second external electrodes on the ceramic body to be connected to the first and second internal electrodes, respectively, wherein the forming of the first and second external electrodes may include: forming a first external electrode layer using a conductive paste containing copper and glass to extend from an end surface of the ceramic body to portions of main and side surfaces of the ceramic body; forming a second external electrode layer on the first external electrode layer using a paste containing glass, the second external electrode layer being shorter than the first external electrode layer so that a portion of the first external electrode layer is exposed; and forming a third external electrode layer using a conductive paste containing copper and glass so as to cover the first and second external electrode layers.

In the forming of the second electrode layer, a width of a band of the second external electrode layer may be equal to or greater than 3 μm from the end surface of the ceramic body and may be less than a width of a band of the first external electrode layer by 10 μm or more.

In the forming of the second electrode layer, the second external electrode layer may contain copper, and a content of glass in the second external electrode layer may be 60 vol % or higher.

The method may further include performing plating on a surface of the third external electrode layer after the forming of the third external electrode layer.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
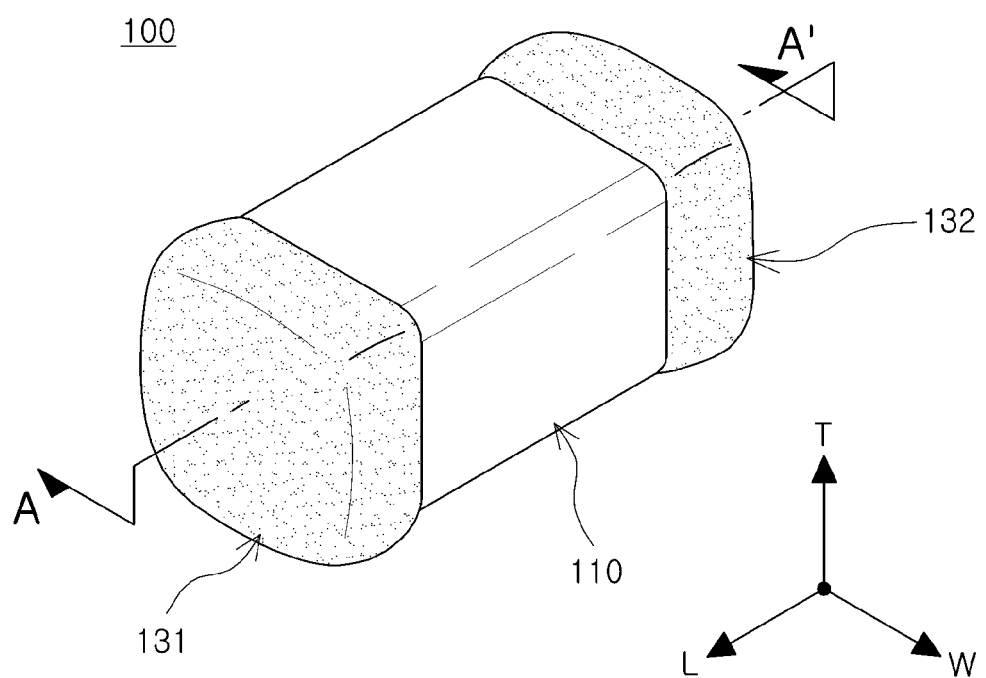
FIG. 1 is a perspective view schematically illustrating a multilayer ceramic capacitor according to an exemplary embodiment of the present disclosure.

Exemplary embodiments of the present disclosure will now be described in detail with reference to the accompanying drawings.

The disclosure may, however, be exemplified in many different forms and should not be construed as being limited to the specific exemplary embodiments set forth herein. Rather, these exemplary embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Multilayer Ceramic Capacitor

Figure 2:
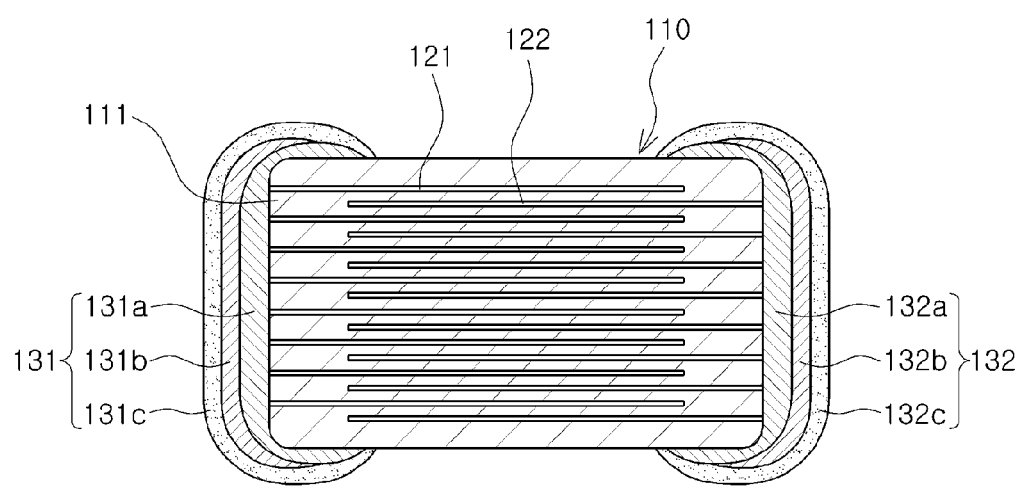
FIG. 2 is a cross-sectional view taken along line A-A' of FIG. 1.

FIG. 1 is a perspective view schematically illustrating a multilayer ceramic capacitor according to an exemplary embodiment of the present disclosure; and FIG. 2 is a cross-sectional view taken along line A-A' of FIG. 1.

Referring to FIGS. 1 and 2, a multilayer ceramic capacitor 100 according to the exemplary embodiment of the present disclosure may include a ceramic body 110, a plurality of first and second internal electrodes 121 and 122, and first and second external electrodes 131 and 132.

The first and second external electrodes 131 and 132 may have a three-layer structure including first external electrode layers 131a and 132a, second external electrode layers 131b and 132b, and third external electrode layers 131c and 132c.

The ceramic body 110 may be formed by stacking a plurality of dielectric layers 111 in a thickness direction and then sintering the same. The shape and dimensions of the ceramic body 110 and the number of stacked dielectric layers 111 are not limited to those shown in the present embodiment.

The plurality of dielectric layers 111 forming the ceramic body 110 may be in a sintered state, so that boundaries between adjacent dielectric layers 111 may not be readily apparent without a scanning electron microscope (SEM).

The shape of the ceramic body 110 may be, but is not limited to, a hexahedral shape.

For the convenience of description, two surfaces of the ceramic body 110 opposing each other in a thickness direction thereof are referred to as main surfaces, two surfaces connecting the main surfaces and opposing each other in a length direction thereof are referred to as end surfaces, and two surfaces perpendicular to the end surfaces and opposing each other in a width direction thereof are referred to as side surfaces.

Further, in order to clearly describe the exemplary embodiment, L, W and T shown in FIG. 1 refer to a length direction, a width direction and a thickness direction of the ceramic body 110, respectively.

Here, the thickness direction may refer to a stacking direction in which the dielectric layers 111 are stacked.

The first and second internal electrodes 121 and 122 having opposite polarities may be formed by printing a conductive paste containing conductive metal on the dielectric layers 111 at a predetermined thickness.

Here, the first and second internal electrodes 121 and 122 may be alternately exposed to both end surfaces of the ceramic body 110, having one dielectric layer 111 interposed therebetween, so that the first and second internal electrodes 121 and 122 may be electrically insulated from each other.

The first and second internal electrodes 121 and 122 may be electrically connected to the first and second external electrodes 131 and 132, through the portions thereof alternately exposed to the end surfaces of the ceramic body 110.

Accordingly, when voltage is applied to the first and second external electrodes 131 and 132, charges may be accumulated between the first and second internal electrodes 121 and 122 facing each other, and the capacitance of the multilayer ceramic capacitor 100 may be proportional to an overlapping area between the first and second internal electrodes 121 and 122.

The thickness of the first and second internal electrodes 121 and 122 may be determined depending on intended use, and may be, but is not limited to, 0.2 μm to 1.0 μm, taking into account the size of the ceramic body 110.

The conductive metal contained in the conductive paste forming the first and second internal electrodes 121 and 122 may be, but is not limited to, silver (Ag), palladium (Pd), platinum (Pt), nickel (Ni), copper (Cu) or an alloy thereof.

The method of printing the conductive paste may include, but is not limited to, screen printing or gravure printing.

The first and second external electrodes 131 and 132 may be formed on the end surfaces of the ceramic body 110 so as to be electrically connected to the exposed portions of the first and second internal electrodes 121 and 122, respectively.

The first and second external electrodes 131 and 132 include the first external electrode layers 131a and 132a formed on both end surfaces of the ceramic body 110 and in direct contact with the exposed portions of the first and second internal electrodes 121 and 122, the second external electrode layers 131b and 132b formed on surfaces of the first external electrode layers 131a and 132a, and the third external electrode layers 131c and 132c covering the first external electrode layers 131a and 132a and the second external electrode layers 131b and 132b.

The first external electrode layers 131a and 132a in direct contact with the first and second internal electrodes 121 and 122 may be formed of a conductive paste containing copper and glass components having superior conductivity. The conductive paste may further include a conductive metal such as silver (Ag), nickel (Ni), copper (Cu) or an alloy thereof, but is not limited thereto.

The first external electrode layers 131a and 132a may extend from the end surfaces of the ceramic body 110 to portions of the main surfaces and the side surfaces of the ceramic body 110.

The second external electrode layers 131b and 132b may be formed of a paste containing a glass component or the like, which is advantageous in increasing density even when they are formed as thin films.

The second external electrode layers 131b and 132b may extend from the end surfaces of the ceramic body 110 to portions of the main surfaces and the side surfaces of the ceramic body 110. The second external electrode layers 131b and 132b may be shorter than the first external electrode layers 131a and 132a so that portions of the first external electrode layers 131a and 132a may be exposed.

Further, a width of a band of the second external electrode layer 131b or 132b may be greater than 5 μm or more from the end surface of the ceramic body 110, and may be smaller than a width of a band of the first external electrode layer 131a or 132a by 10 μm or more.

The second external electrode layers 131b and 132b may contain a conductive metal if necessary, and the content of glass may be 60 vol % or higher based on the total content of components. The conductive metal may be, but is not limited to, at least one of silver (Ag), nickel (Ni), copper (Cu), and an alloy thereof.

The third external electrode layers 131c and 132c may be formed of a conductive paste containing copper and glass components. The conductive paste may further include, but is not limited to, silver (Ag), nickel (Ni), copper (Cu) or an alloy thereof.

The third external electrode layers 131c and 132c may extend from the end surfaces of the ceramic body 110 to portions of the main surfaces and the side surfaces of the ceramic body 110.

Here, the second external electrode layers 131b and 132b have low electrical conductivity. In order to connect the internal electrodes to an external power source, the second external electrode layers 131b and 132b may be shorter than the first external electrode layers 131a and 132a and the third external electrode layers 131c and 132c, thereby allowing the first external electrode layers 131a and 132a to be electrically connected to the third external electrode layers 131c and 132c.

For example, areas in which the first external electrode layers 131a and 132a are in contact with the third external electrode layers 131c and 132c should be disposed between the end surfaces of the ceramic body 110 and edges of the first external electrode layers 131a and 132a. Otherwise, it may be difficult to secure reliability and implement capacitance.

That is, when the areas in which the first external electrode layers 131a and 132a are in contact with the third external electrode layers 131c and 132c are disposed beyond the end surfaces of the ceramic body 110, it may be difficult to prevent a plating solution from permeating into corners of the ceramic body 110, causing a reliability issue. In addition, when the width of the band of the second external electrode layer 131b or 132b is greater than that of the band of the first external electrode layer 131a or 132a, the first external electrode layer 131a or 132a cannot be in contact with the third external electrode layer 131c or 132c and the content of glass will be high, whereby capacitance may not be properly implemented.

Further, a plating layer may be formed on each of the third external electrode layers 131c and 132c.

The plating layer may include a nickel (Ni)-plating layer formed on the third external electrode layers 131c and 132c, and a tin (Sn)-plating layer formed on the Ni-plating layer.

The plating layers are provided to enhance bonding strength when the multilayer ceramic capacitor 100 is mounted on a printed circuit board or the like by soldering.

Method of Manufacturing Multilayer Ceramic Capacitor

Hereinafter, a method of manufacturing a multilayer ceramic capacitor according to an exemplary embodiment of the present disclosure will be described.

Initially, a plurality of ceramic sheets may be prepared. The ceramic sheets may be used in forming the dielectric layers 111 of the ceramic body 110. Slurry may be produced by mixing ceramic powder, a polymer, a solvent and the like, and the slurry may be applied to carrier films by a doctor blade method or the like and dried, thereby forming sheets of several μm.

Then, a conductive paste may be printed on at least one surface of individual ceramic sheets at a predetermined thickness, thereby forming the first and second internal electrodes 121 and 122.

The first and second internal electrodes 121 and 122 may be exposed through ends of the ceramic sheets in the length direction.

The method of printing the conductive paste may include, but is not limited to, screen printing or gravure printing.

Subsequently, the ceramic sheets having the first and second internal electrodes 121 and 122 formed thereon may be stacked such that the first and second internal electrodes 121 and 122 face each other having the ceramic sheet interposed therebetween, and be then pressed to obtain a laminate.

Here, the laminate may be obtained by stacking and pressing the ceramic sheets in the thick direction.

Figure 3A:
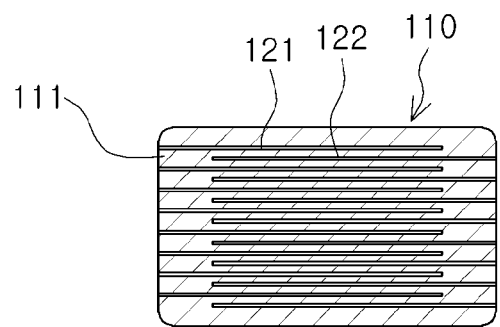
FIGS. 3A through 3D are cross-sectional views illustrating a process of forming external electrodes of a multilayer ceramic capacitor according to an exemplary embodiment of the present disclosure.

Then, the laminate is cut into chips each corresponding to a single capacitor and sintered at high temperature. As illustrated in FIG. 3A, the ceramic body 110 may have first and second main surfaces opposing each other in the thickness direction, first and second end surfaces opposing each other in the length direction through which the first and second internal electrodes 121 and 122 are alternately exposed, and first and second side surfaces opposing each other in the width direction.

Then, the first and second external electrodes 131 and 132 may be formed to be electrically connected to the exposed portions of the first and second internal electrodes 121 and 122, respectively.

Now, a method of forming first and second external electrodes according to an exemplary embodiment of the present disclosure will be described in detail.

Figure 3B:
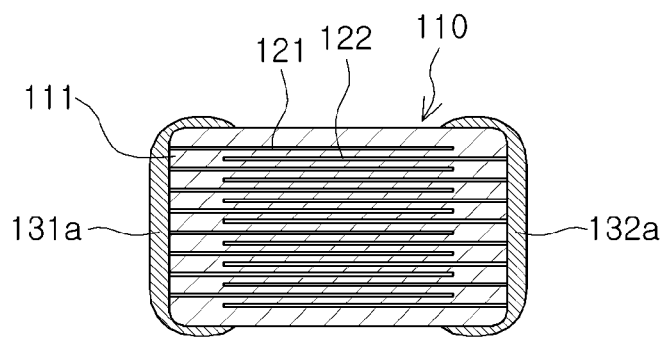

First, referring to FIG. 3B, the first external electrode layers 131a 132a may be formed of a conductive paste containing copper and glass, and may be formed on the first and second end surfaces of the ceramic body 110 such that they may cover the first and second internal electrodes 121 and 122 exposed through the first and second end surfaces of the ceramic body 110.

The first external electrode layers 131a and 132a may extend from the first and second end surfaces of the ceramic body 110 to portions of the first and second main surfaces and the first and second side surfaces of the ceramic body 110.

The application of the conductive paste may be performed using dipping or various printing methods, but is not limited thereto.

In addition, after the conductive paste is applied to the ceramic body 110, a heat treatment may be performed to harden the applied conductive paste.

Figure 3C:
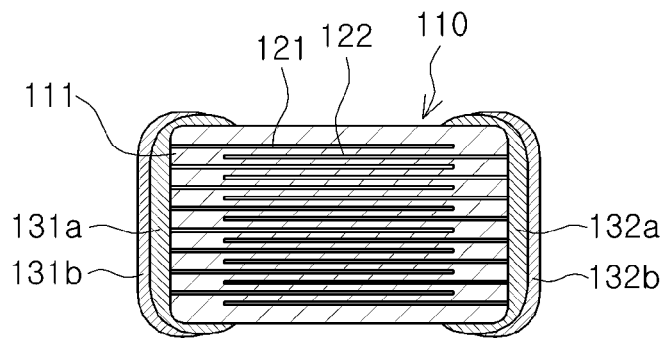

Then, referring to FIG. 3C, the second external electrode layers 131b and 132b may be formed of a paste containing glass, and may be formed on the first external electrode layers 131a and 132a while extending from the first and second end surfaces to portions of the first and second main surfaces. The second external electrode layers 131b and 132b may also be formed on portions of the first and second side surfaces. The second external electrode layers 131b and 132b may be shorter than the first external electrode layers 131a and 132a so that portions of the first external electrode layers 131a and 132a are exposed.

The application of the conductive resin paste may be performed using dipping or various printing methods, but is not limited thereto.

After the application of the conductive resin paste, a heat treatment may be performed to harden the applied conductive resin paste.

Figure 3D:
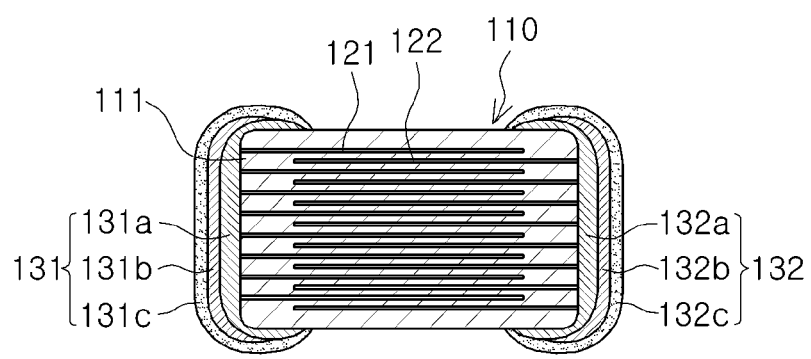

Then, referring to FIG. 3D, the third external electrode layers 131c and 132c may be formed of a paste containing copper and glass, and may be formed to extend from the first and second end surfaces to portions of the first and second main surfaces while covering the first external electrode layers 131a and 132a and the second external electrode layers 131b and 132b. The third external electrode layers 131c and 132c may also be formed on portions of the first and second side surfaces.

The application of the conductive resin paste may be performed using dipping or various printing methods, but is not limited thereto.

After the application of the conductive resin paste, a heat treatment may be performed to harden the applied conductive resin paste.

Optionally, after the third external electrode layers 131c and 132c are formed, plating layers may be formed by performing electroplating on surfaces of the third external electrode layers 131c and 132c.

The material used in electroplating may include, but is not limited to, nickel, tin or an alloy of nickel and tin.

Optionally, the plating layer may be formed by sequentially stacking a nickel-plating layer and a tin-plating layer on the third external electrode layers 131c and 132c.

Table 1 below shows test results of reliability failures and capacitive coupling defects of multilayer ceramic capacitors according to widths of bands of second external electrode layers when the second external electrode layers were only formed of glass.

Here, based on an end surface of a ceramic body in a 1005 size chip, a width of a band of a first external electrode layer was 140 μm, and a width of a band of a third external electrode layer was 160 μm.

TABLE 1

| Width of Band of Second External Electrode Layer | Reliability Failure (N = 400) | Capacitive Coupling Defect (N = 200) |
| --- | --- | --- |
| −10 | 9/400 | 0/200 |
| 0 | 6/400 | 0/200 |
| 3 | 0/400 | 0/200 |
| 5 | 0/400 | 0/200 |
| 10 | 0/400 | 0/200 |
| 30 | 0/400 | 0/200 |
| 70 | 0/400 | 0/200 |
| 130 | 0/400 | 0/200 |
| 135 | 0/400 | 27/200 |
| 140 | 0/400 | 200/200 |
| 150 | 0/400 | 200/200 |

As can be seen from Table 1, there was no reliability failure when the width of the band of the second external electrode layer was equal to or greater than 3 μm based on the end surface of the ceramic body.

However, when the width of the band of the second external electrode layer was greater than 130 μm, capacitive coupling defects occurred due to excessive glass components. When the width of the band of the second external electrode layer was greater than 130 μm, the second external electrode layer was applied beyond the band of the first external electrode layer.

Therefore, the width of the band of the second external electrode layer may be equal to or greater than 3 μm from the end surface of the ceramic body and may be less than that of the band of the first external electrode layer by 10 μm or more.

Table 2 below shows test results related to reliability of multilayer ceramic capacitors according to the content of glass in second external electrode layers when a width of a band of a second external electrode layer was 70 μm.

TABLE 2

| Content of Glass in Second External Electrode Layers | Reliability Failure (N = 400) |
| --- | --- |
| 10 | 17/400 |
| 20 | 14/400 |
| 30 | 8/400 |
| 40 | 2/400 |
| 50 | 1/400 |
| 60 | 0/400 |
| 70 | 0/400 |
| 80 | 0/400 |
| 90 | 0/400 |
| 100 | 0/400 |

As can be seen from Table 2, there was no reliability failure when the content of glass in the second external electrode layers was 60 vol % or higher.

As set forth above, according to exemplary embodiments of the present disclosure, reliability deterioration due to low density in external electrodes may be overcome by forming two external electrode layers containing a copper-glass paste in a region in contact with internal electrodes and a region to be plated, and forming one external electrode layer disposed therebetween using a paste containing glass.

While exemplary embodiments have been shown and described above, it will be apparent to those skilled in the art that modifications and variations could be made without departing from the spirit and scope of the present disclosure as defined by the appended claims.

What is claimed is:

1. A multilayer ceramic capacitor, comprising:
a ceramic body including a plurality of dielectric layers;
first and second internal electrodes facing each other while having at least one dielectric layer disposed therebetween, and alternately exposed to end surfaces of the ceramic body; and
first and second external electrodes electrically connected to the first and second internal electrodes, respectively, wherein each of the first and second external electrodes includes:
a first external electrode layer formed of a material containing copper and glass and extending from an end surface of the ceramic body to portions of main and side surfaces of the ceramic body;
a second external electrode layer formed of a material containing glass, disposed on the first external electrode layer, and being shorter than the first external electrode layer to expose a portion of the first external electrode layer; and a third external electrode layer formed of a material containing copper and glass and covering the first and second external electrode layers.

2. The multilayer ceramic capacitor of claim 1, wherein a width of a band of the second external electrode layer is equal to or greater than 3 μm from the end surface of the ceramic body and is less than a width of a band of the first external electrode layer by 10 μm or more.

3. The multilayer ceramic capacitor of claim 1, wherein the second external electrode layer contains copper, and
 a content of glass in the second external electrode layer is 60 vol % or higher.

4. The multilayer ceramic capacitor of claim 1, further comprising a plating layer disposed on the third external electrode layer.

5. A method of manufacturing a multilayer ceramic capacitor, the method comprising:
 preparing a laminate by stacking a plurality of ceramic sheets having first and second internal electrodes formed thereon while the first and second internal electrodes face each other, having at least one ceramic sheet interposed therebetween, and pressing the stacked sheets;
 cutting the laminate into chips each corresponding to a capacitor and sintering the same to obtain a ceramic body; and
 forming first and second external electrodes on the ceramic body to be connected to the first and second internal electrodes, respectively,
 wherein the forming of the first and second external electrodes includes:
  forming a first external electrode layer using a conductive paste containing copper and glass to extend from an end surface of the ceramic body to portions of main and side surfaces of the ceramic body;
  forming a second external electrode layer on the first external electrode layer using a paste containing glass, the second external electrode layer being shorter than the first external electrode layer so that a portion of the first external electrode layer is exposed; and
  forming a third external electrode layer using a conductive paste containing copper and glass so as to cover the first and second external electrode layers.

6. The method of claim 5, wherein a width of a band of the second external electrode layer is equal to or greater than 3 μm from the end surface of the ceramic body and is less than a width of a band of the first external electrode layer by 10 μm or more.

7. The method of claim 5, wherein the second external electrode layer contains copper, and
 a content of glass in the second external electrode layer is 60 vol % or higher.

8. The method of claim 5, further comprising performing plating on a surface of the third external electrode layer after the forming of the third external electrode layer.

* * * * *